United States Patent [19]

Williams

[11] Patent Number: 5,775,500

[45] Date of Patent: Jul. 7, 1998

[54] MULTIPLE AUDIO CASSETTE CONTAINER

[75] Inventor: Matthew P. Williams, North Canton, Ohio

[73] Assignee: Alpha Enterprises, Inc., North Canton, Ohio

[21] Appl. No.: 857,321

[22] Filed: May 16, 1997

[51] Int. Cl.$^6$ ................................................ B65D 85/57
[52] U.S. Cl. ............................. 206/387.1; 206/387.13
[58] Field of Search ......................... 206/387.1, 387.13, 206/387.14, 308.1, 313, 312, 309, 307.1, 472, 473

[56] References Cited

U.S. PATENT DOCUMENTS

| | | | |
|---|---|---|---|
| 3,593,845 | 7/1971 | Schwartz | 206/1 |
| 3,640,379 | 2/1972 | Weingarden | 206/387.13 |
| 3,743,081 | 7/1973 | Roberg et al. | 206/387.13 |
| 3,876,071 | 4/1975 | Neal et al. | 206/387 |
| 3,896,929 | 7/1975 | Mills | 206/387 |
| 4,002,355 | 1/1977 | Sender | 206/387.13 |
| 4,056,244 | 11/1977 | Matsutsuka | 242/197 |
| 4,078,657 | 3/1978 | Schurman | 206/387 |
| 4,219,118 | 8/1980 | Somers | 206/387 |
| 4,231,474 | 11/1980 | Takahashi | 206/387 |
| 4,253,567 | 3/1981 | Goldammer | 206/387 |
| 4,291,801 | 9/1981 | Basili et al. | 206/387 |
| 4,327,831 | 5/1982 | Inaba et al. | 206/313 |
| 4,365,711 | 12/1982 | Long et al. | 206/387 |
| 4,407,410 | 10/1983 | Graetz et al. | 206/387 |
| 4,496,048 | 1/1985 | SYKES | 206/387.13 |
| 4,512,468 | 4/1985 | Stravitz | 206/387 |
| 4,593,814 | 6/1986 | Hagiwara et al. | 206/387 |
| 4,614,296 | 9/1986 | Dietze et al. | 206/387 |
| 4,696,401 | 9/1987 | Wallace | 206/594 |
| 4,753,347 | 6/1988 | Bellante et al. | 206/387 |
| 4,789,061 | 12/1988 | Roze | 206/387.13 |
| 4,823,950 | 4/1989 | Roze | 206/473 |
| 4,951,814 | 8/1990 | Belment | 206/387.14 |
| 5,044,497 | 9/1991 | Weisburn et al. | 206/387 |
| 5,161,907 | 11/1992 | Byrne | 206/387.13 |
| 5,165,541 | 11/1992 | Morita | 206/387 |
| 5,443,159 | 8/1995 | Cheng | 206/387.13 |
| 5,477,960 | 12/1995 | Chen | 206/309 |
| 5,549,203 | 8/1996 | Weisburn et al. | 206/473 X |
| 5,562,207 | 10/1996 | O'Brien et al. | 206/387.13 |

FOREIGN PATENT DOCUMENTS

2 179 328   3/1987   United Kingdom ........... B65D 43/22

*Primary Examiner*—Jacob K. Ackun
*Attorney, Agent, or Firm*—Sand & Sebolt

[57] ABSTRACT

An audio cassette storage container formed as a one-piece member of polypropylene where the container includes two or more cavities for receiving audio cassettes and has a smooth outer contour and configured sidewalls and hinge area to provide an extremely aesthetically pleasing and efficient storage container. The container further has square feet on one end thereof for endwise standing of the audio storage container. The container also has a recessed front for easy opening where the recessed front is also arcuate or scalloped so as to extend inward into the container to assist in holding and centering audio cassette tapes. The container also has ribs on the inner surface thereof which automatically centers the audio cassette and its associated literature into the storage container during manual insertion of a cassette therein. The interior of the container may be configured to include either two or four cavities within the base and/or lid for audio cassette receipt, as well as an additional hingedly mounted center tray for supplementally receiving at least two more audio cassettes. Each cavity includes a pair of stems for aligning the audio cassette therein, while only one of the stems is used for securing. The pair of stems further provides slack such that the audio cassette is movable about the planar stem during bending, flexing and twisting of the container such as during opening thereby preventing "popping" out.

24 Claims, 7 Drawing Sheets

MULTIPLE AUDIO CASSETTE CONTAINER

BACKGROUND OF THE INVENTION

1. Technical Field

The invention relates to a storage container and, in particular, to a storage container for multiple audio cassettes. Even more particularly, the invention relates to a multiple audio cassette storage container formed as a one-piece member of polypropylene, having a smooth outer contour and configured sidewalls and hinge area to provide an extremely aesthetically pleasing and efficient storage container, having square feet on one end thereof for endwise standing of the audio storage container, having a recessed front for easy opening which is also scalloped inward to hold tapes, and having guide walls on an inner surface thereof which define cassette-receiving cavities each for selectively housing a cassette. The audio cassette container selectively includes at least one snap-in, pivotable supplemental storage receptacle including additional cassette-receiving cavities.

2. Background Information

Numerous containers for various articles, including video and audio cassette tapes, have been developed, usually of plastic materials, such as shown for video cassettes in U.S. Pat. Nos. 4,291,801, 4,363,403, 4,365,711, 4,407,410, 4,635,797, and 4,784,264; and for audio cassettes in U.S. Pat. Nos. 3,593,845, 3,896,929, 4,219,118, 4,512,468, 5,044,497, and 5,165,541. Although these prior art storage containers are satisfactory for their intended purposes, many are made of various types of plastics, such as crystal polystyrene, which is brittle and subject to breakage, and when molded will have a square appearance with straight edges terminating in sharp corners and edges. It has been found that these straight edges terminating in sharp corners and edges promote breakage of the storage containers when dropped.

Many of the prior art storage containers also include a closure mechanism that occupies space within the storage compartment thereby increasing the overall size of the container. In many of today's entertainment centers and other audio storage areas, space is an important constraint, particularly based upon the large audio libraries many homes have today. Therefore, many of these containers needlessly occupy more space than necessary.

Likewise, the hinge assembly of many prior art containers requires that the containers be closed in a single fashion often requiring precise and meticulous alignment of the audio cassette within the audio storage container. Often this single fashion closing is also not readily accomplished by small children or the elderly.

Likewise, many of the prior art storage containers are difficult to open by children and/or elderly, since their small or unreliable hands are unable to grip the entire outer cover and base for pulling the container apart in order to gain access to the audio cassette stored therein.

In addition, some of the audio storage containers do not include at least one square surface for standing of the audio cassettes within the container as is often desirable during storage. Alternatively, some of the containers that do contain an edge sufficient for standing the audio storage container are often very sharp edges or corners which as indicated above are undesirable. Furthermore, these edges that are sufficient for standing often increase substantially the overall size of the container.

Furthermore, many of the audio cassette storage containers are rigid structures and are thus not capable of minimal bending or twisting as is preferable to assist the user in removing the audio cassette from the storage container. The ability to slightly bend or twist the container would facilitate cassette removal.

In addition, many of the prior art audio storage containers are either oversized, that is larger than the preferred approximately 7" to 8" high by 4" to 5" wide which is comparable to video cassette storage container size, or will only hold two or four audio cassettes. Often storage of more than four audio cassettes is desirable but the limitations or preferences of the entertainment center or other audio storage area is such that only standard video-sized containers or smaller will fit.

Many of these prior art audio storage containers either merely house but do not securely hold, or conversely too securely hold the audio cassettes as previously discussed. Furthermore, often such secure holding incorporates multiple securing hubs where either one is within each of the two reels in a standard audio cassette, or flanges or nubs that hold the entire cassette body about its periphery.

This hub within each reel design is problematic in that, during opening of the container, the audio cassette often "pops" off the hubs due to bending and flexing of the container in conjunction with the tight fit of the hubs.

Thus, the need exists for an improved audio cassette storage container capable of housing multiple audio cassettes and resolving the above disadvantages.

SUMMARY OF THE INVENTION

Objectives of the invention include providing an improved audio cassette storage container formed as a one-piece member of plastic and capable of housing a plurality of audio cassettes while preferably being of the most desirable overall size which is equivalent to video cassette storage containers.

Another objective of the invention includes providing a n improved audio cassette storage container formed as a one-piece member of plastic with the sides thereof having radiused rounded edges.

Another objective of the invention includes providing an improved audio cassette storage container formed as a one-piece member of plastic with a rounded spine formed by a double living hinge panel assembly to provide an attractive and compact storage container.

A further objective of the invention is to provide such a storage container in which the latch mechanism that maintains the storage container in a closed position is achieved by a small pair of nubs formed on one of the half-wall members which seat into a complementary-shaped pair of recesses formed in an opposite half-wall member of the container.

A further objective of the invention is to provide such a storage container in which central portions of the front wall of the base and lid are slightly recessed to provide larger overhang areas on the base and lid which can be easily grasped by a child to open the storage container without affecting the size of the container and its attractive appearance.

A further objective of the invention is to provide a recessed front in which central portions of the front wall of the base and lid are recessed so as to extend within the interior of the audio cassette storage container in a scalloped fashion thereby providing a surface that helps to align the audio cassette when inserted within one of the cassette-receiving cavities in the storage container.

A further objective of the invention is to provide such a storage container having a unique end wall configuration at the ends of a concavely curved hinge panel which enables the base and lid to be moved into a closed position irrespective of the manner of movement of the base, lid or hinge assembly.

A further objective of the invention is to provide such a storage container in which a plurality of walls and guide members are formed integrally on the inside surfaces of either the base or lid walls and main panel thereof to define an area for receiving the audio cassettes, which will prevent the cassette from moving or rattling within the storage compartment formed by the container when in its closed position.

A further objective of the invention is to provide such a storage container in which the front and end walls of the base and lid are equal in height, with one of the closure members having a stepped shoulder and an extending recessed wall portion for aligning with the edges of the end and front walls of the corresponding container member when in the closed position.

A further objective of the invention is to provide such a storage container in which the front corners of the base and lid are rounded and align with each other when in the closed position to provide an attractive streamlined appearance, individually and in combination with the rounded spine provided by the double hinge panel assembly.

A further objective of the invention is to provide such a storage container in which a plurality of ribs and guides are formed on the inner surface of each one of the audio cassette-receiving cavities in either of the base or lid to facilitate the automatic guiding and centering of the audio cassette in the cavity within the storage container.

A further objective of the invention is to provide a storage container sized to fit within the storage areas on standard entertainment centers, preferably no larger than 7" to 8" high, 4" to 5" wide, and 1" to 3" deep.

A further objective of the invention is to provide a storage container capable of housing a plurality of audio cassette tapes, preferably capable of housing up to six audio cassette tapes.

A further objective of the invention is to provide a storage container capable of housing a plurality of audio cassette tapes, preferably up to six, while also being of an overall size not to exceed 7" to 8" high and 4" to 5" wide.

A further objective of the invention is to provide a storage container including a center tray hingedly connected to the case for pivoting so as to be selectively positionable as desired.

A further objective of the invention is to provide a storage container including a center tray hingedly connected to the case such that the center tray is capable of laying upon one side of the case from opening to closing of the case, and is pivotable from that side to the other side at any time while the case is fully or partially open.

A further objective of the invention is to provide a storage container capable of housing a plurality of audio cassettes where the design of the stems for holding the audio cassettes is such that it prevents popping off or out of the audio cassette during opening.

A further objective of the invention is to provide a storage container capable of housing a plurality of audio cassettes, each audio cassette being held within the storage container by a hub or volumetric stem insertable within one of the reels of an audio cassette.

A further objective of the invention is to provide a storage container capable of housing a plurality of audio cassettes, each audio cassette being held within the storage container by a hub or volumetric stem insertable within one of the reels of an audio cassette, and guided by a planar stem or guide insertable within the other of the reels in the audio cassette.

These objectives and advantages are obtained by the improved audio cassette storage container of the present invention, the general nature of which may be stated as including a base and a lid each having a bottom wall, a pair of spaced end walls and a front wall, a lid hingedly mounted on the base and movable between open and closed positions on said base, said base and lid forming a storage chamber therebetween when in the closed position, and guide means formed on certain of the walls of the lid and extending into the storage chamber for guiding the article into the storage chamber.

DESCRIPTION OF THE PREFERRED EMBODIMENT(S)

Figure 1:
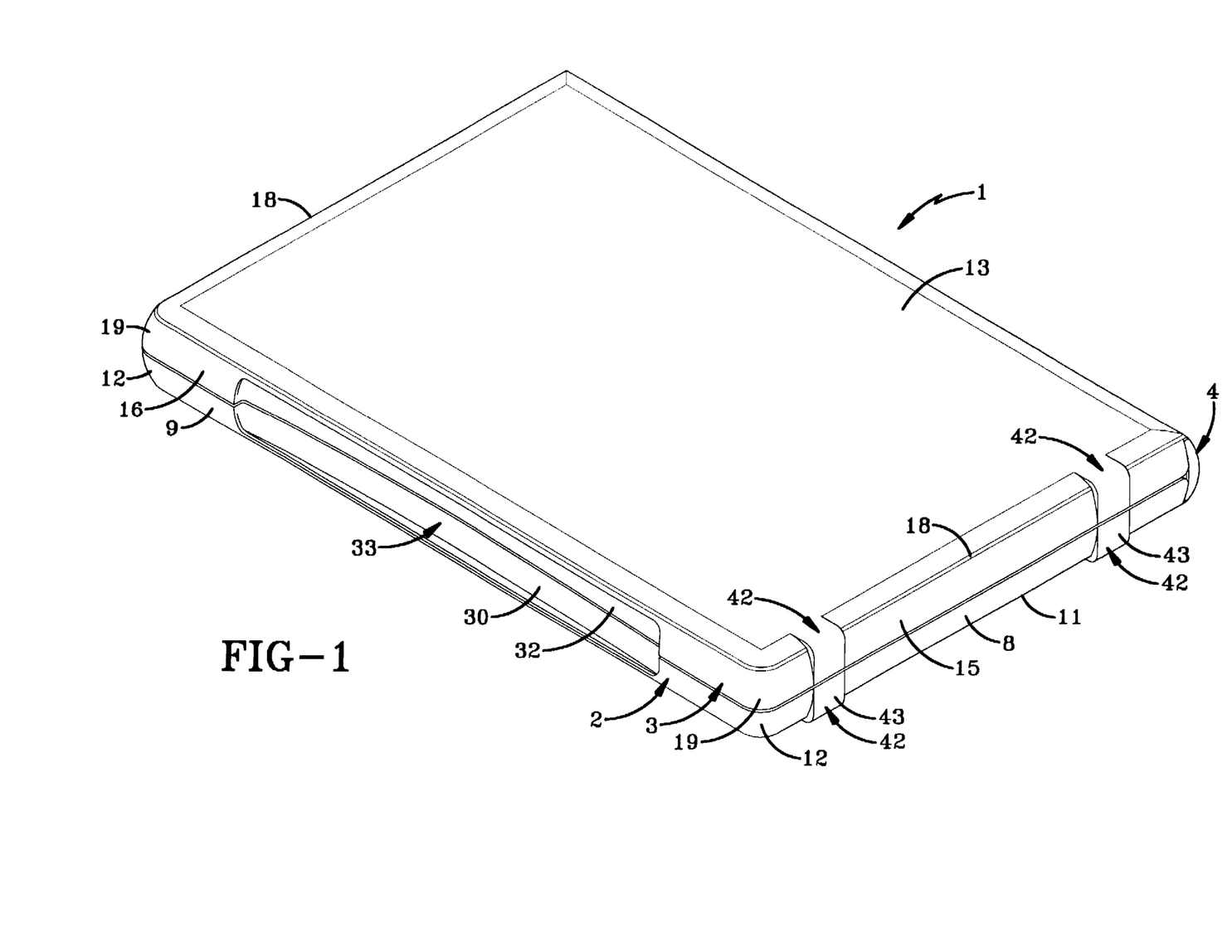
FIG. 1 is a perspective view of a two-cassette embodiment of the audio cassette container of the present invention in a closed position.
Figure 2:
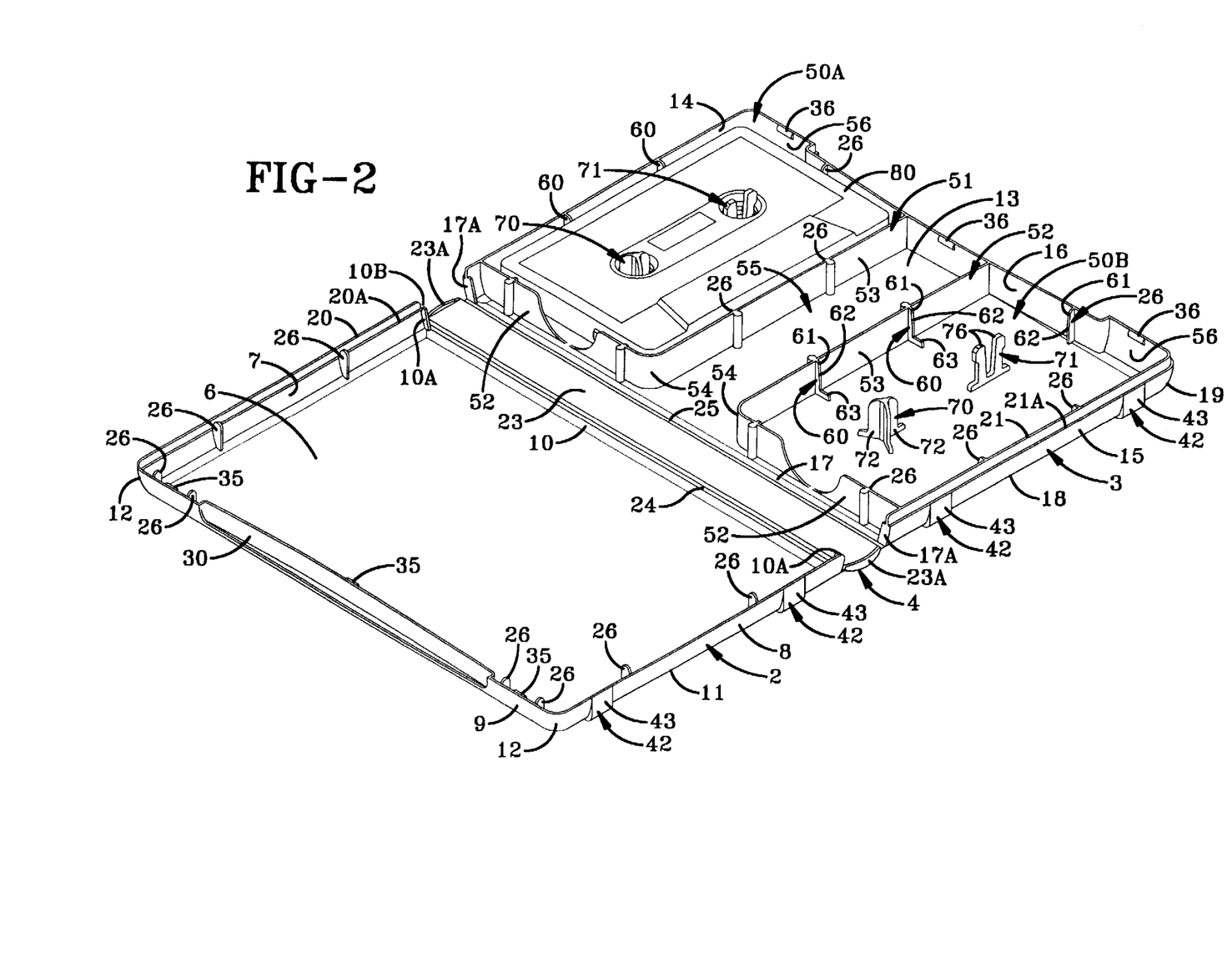
FIG. 2 is a perspective view of the audio cassette container of FIG. 1 in an open position holding one audio cassette therein.
Figure 4:
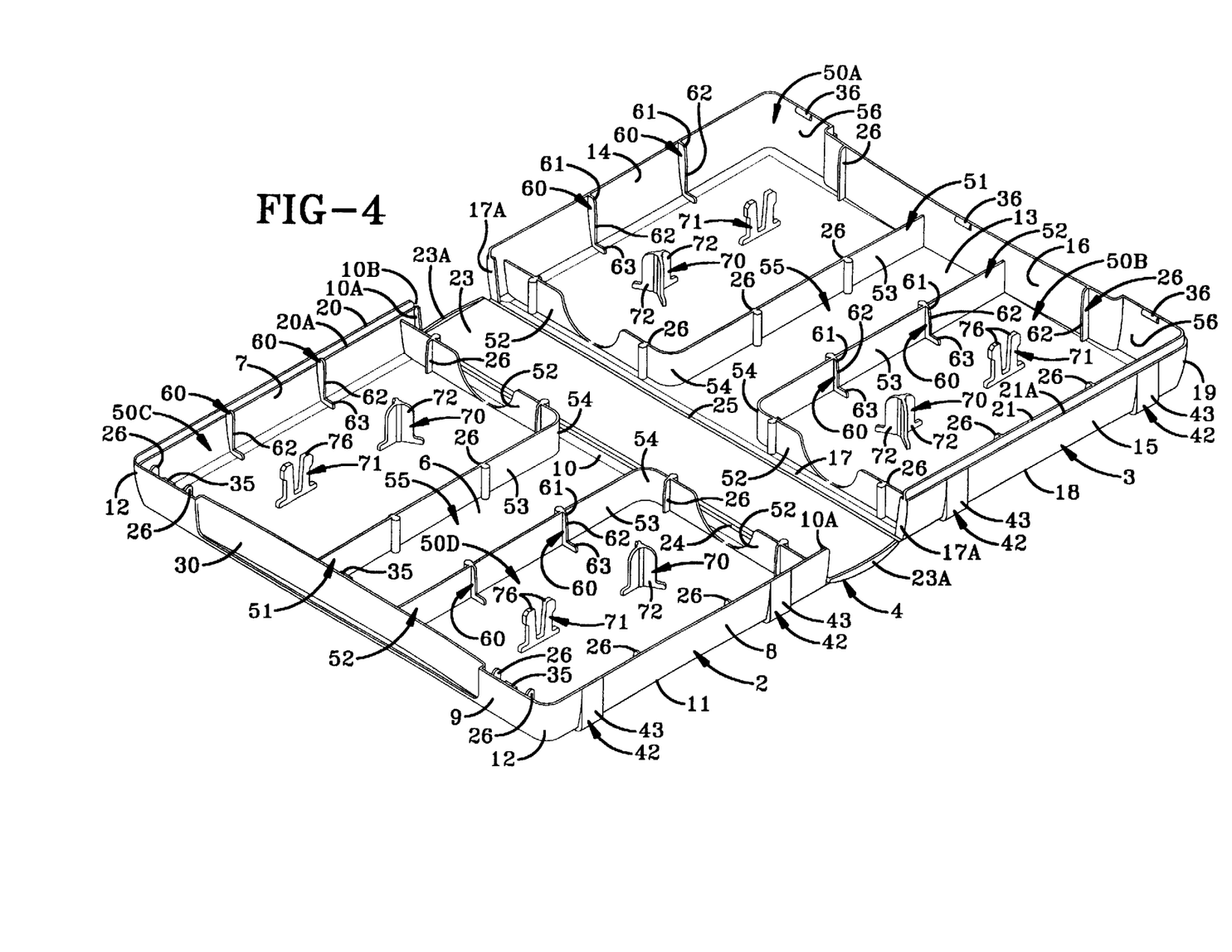
FIG. 4 is a perspective view of a four-cassette embodiment of the audio cassette container of the present invention in an open position.
Figure 5:
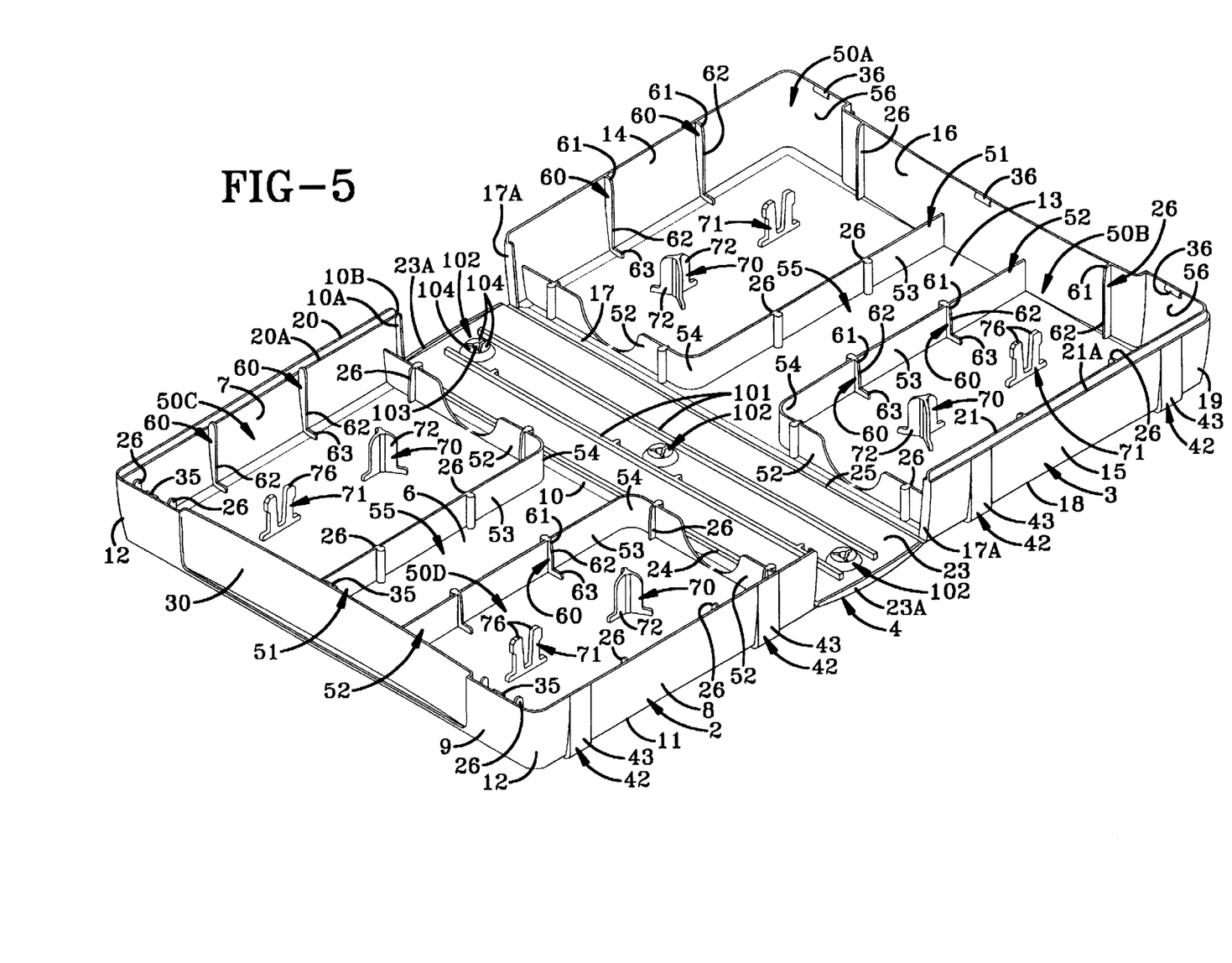
FIG. 5 is a perspective view of a six-cassette embodiment of the audio cassette container of the present invention in an open position with the center tray removed.
Figure 6:
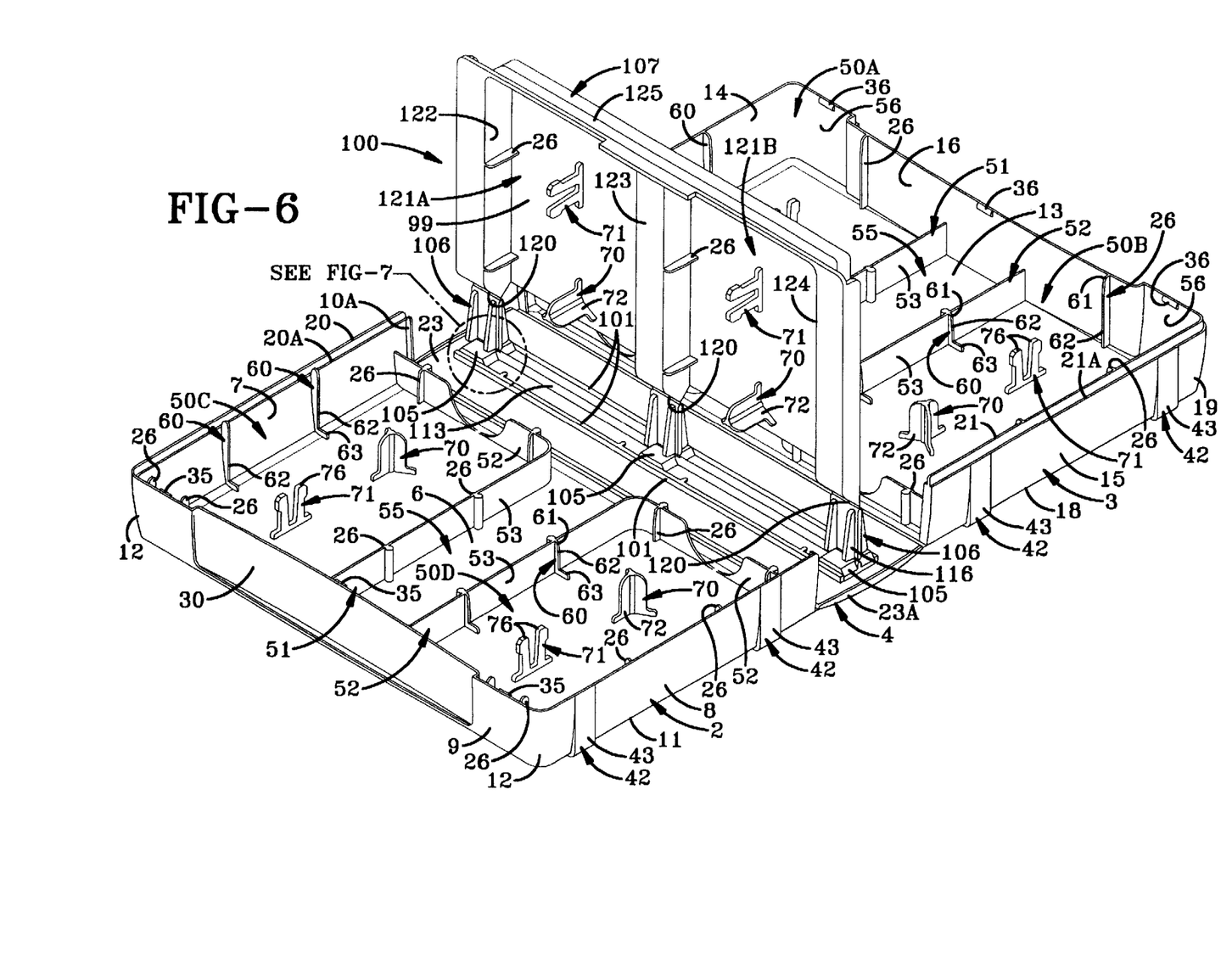
FIG. 6 is a perspective view of the audio cassette container of FIG. 5 with the center tray attached and vertically positioned.
Figure 8:
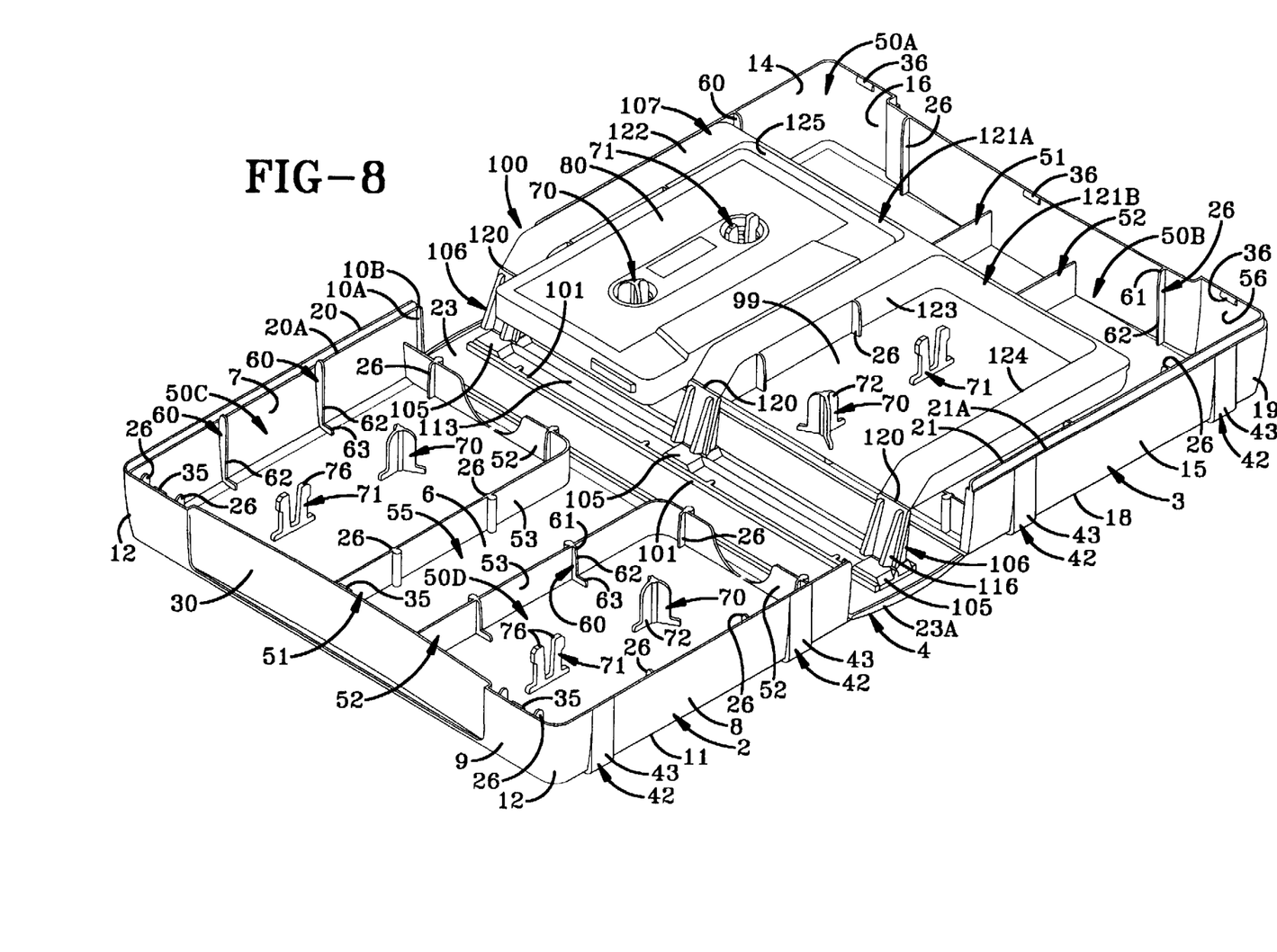
FIG. 8 is perspective view of the audio cassette container of FIG. 6 with the center tray attached but pivoted to its horizontal position.

A first or two-cassette embodiment of the audio cassette storage container of the present invention is generally indicated at 1 and as is shown in FIG. 1 in a closed latched position and in FIG. 2 in a full open position. A second or four-cassette embodiment of the audio cassette storage container of the present invention is generally indicated at 100 and is shown in FIG. 4 in a full open position. A third or six-cassette embodiment of the audio cassette storage container of the present invention is generally indicated at 200 and is shown in FIGS. 5–6 and 8. As to the first embodiment, container 1 has a rectangular box-shaped configuration and preferably is molded of a plastic material, such as a high impact polypropylene. Container 1 includes a closure lid and base, indicated generally at 2 and 3, respectively, which are hingedly connected together by a hinge assembly 4 for movement between the full open position, as shown in FIG. 1, and the closed position, as shown in FIG. 2.

Closure lid 2 (FIGS. 1 and 2) has a rectangular-shaped bottom wall or panel 6 with upstanding parallel side walls 7 and 8, an upstanding front wall 9, and a slight upstanding rear wall or ridge 10 (either within lid 2 or immediately adjacent thereto in hinge 4). In accordance with one of the features of the invention, walls 7–10 are formed integrally with bottom wall 6 forming an outer rounded edge 11 therebetween, and side walls 7–8 are formed integrally with front and rear walls 9–10 forming outer rounded corners 12 therebetween. Sidewalls 7–8 and front end wall 9 are equal in height, while rear end wall 10 is substantially less in height, and in effect, more of a nub than a wall.

In addition, each of side walls 7 and 8, and 14 and 15, may further include a transverse tab 10A on walls 7 and 8, and 17A on walls 14 and 15. This tab is in addition to short walls 10 and 17, and this tab extends substantially perpendicular from walls 7,8,14 and 15 and substantially perpendicular from panels 6 and 13 at a plane on each of walls 7, 8, 14 and 15 nearest hinge 14 as is shown in FIG. 2. The walls 10A on panel 6 of lid 2 include a notch 10B for receiving the outermost edge of walls 14 and 15 when the container 1 is closed (this outermost edge being later described as 21B).

Base 3 (FIGS. 1 and 2) has a flat rectangular-shaped top closure wall or panel 13, similar in size and configuration to bottom wall 6. Base 3 also has upstanding parallel side walls 14 and 15, an upstanding front wall 16, and a slight upstanding rear wall or ridge 17 (either in base 3 or immediately adjacent thereto in hinge 4), where walls 14–17 are similar in size and configuration to walls 7–10, respectively. Walls 14–17 are formed integrally with closure wall 13 forming an outer rounded edge 18 therebetween, and side walls 14–15 are formed integrally with front and rear end walls 16–17, respectively, forming outer rounded corners 19 therebetween. Sidewalls 14–15 and front end wall 16 are equal in height while rear end wall 17 is substantially less in height, and in effect, more of a nub than a wall.

Walls 7–9 of lid 2 include an outwardly extending top lip 20 which is planar with the outside surface of the walls 7–9 while defining an inner stepped shoulder 20A. Similarly yet in contrast, walls 14–16 of base 3 include an inwardly extending top lip 21 which is planar with the inner surface of the walls 14–16 while defining an outer stepped shoulder 21A which receives lip 20. This overlap of lips 20–21 along and against shoulders 20A–21A allows lid 2 and base 3 to form a relatively dust-free seal therebetween when container 1 is in the closed position.

Hinge assembly 4 extends between lid 2 and base 3 and includes a rectangular-shaped hinge panel 23 pivotally connected between lid 2 and base 3 by a pair of spaced apart, parallel living hinges 24 and 25, respectively. Living hinge 24 is formed integrally with or adjacent to the rear wall 10 of lid 2 and living hinge 25 is formed integrally with or adjacent to the rear wall 17 of base 3. Hinge panel 23 has a slightly concave configuration and terminates in opposing outer curved end edges. A small upstanding hinge closure end wall 23A is formed at these outer curved end edges at each end of hinge panel 23.

In accordance with one of the features of the invention, a plurality of ribs 26 extend inwardly from various inner surfaces of the lid 2 and base 3 including from the inner surface of walls 7–9 of lid 2, and from the inner surface of walls 14–15 of base 3. These ribs 26 are for assisting in the positioning of a usual audio cassette tape within audio cassette-receiving cavities in either or both lid 2 and base 3 as described below in more detail. In addition, these ribs supply strength to the structure.

Front end walls 9 and 16 of lid 2 and base 3, respectively, each have an inwardly angled arcuate-shaped section 30 and 32, respectively, which extends partially between and spaced apart from end walls 7–8 and 14–15, respectively. When lid 2 and base 3 are closed as is shown in FIG. 1, inwardly angled arcuate-shaped sections 30 and 32 align to form a central cavity 33. Cavity 33 allows a user to easily open container 1 when container 1 is in the closed latched position. Specifically, front walls 9 and 16 of lid 2 and base 3 are formed with slightly concave central portions so that when in the closed position, as shown in FIG. 1, larger grasping areas are provided which are of particular importance due to the rounded edges on container 1 since these grasping or ledged areas facilitate the opening of the storage container, especially by smaller children who must grab these areas to pull the container apart.

The arcuate nature of sections 30 and 32 is specifically of a scalloped or comparable nature in which the centermost area of the sections extends the furthest inward. This arcuate nature not only facilitates opening but it also may function to assist in centrally positioning a usual audio cassette tape within lid 2 and base 3 as no ribs 26 are needed along the centermost portion of each scallop.

The inner surface of front end wall 9 of lid 2 between top lip 20 and shoulder 20A includes inwardly projecting nubs 35, and the outer surface of front end wall 16 of base 3 between top lip 21 and stepped shoulder 21A includes inwardly extending slots 36 (which project through the lip 21 and define an outwardly extending nub on the inner surface thereof). During closure of container 1, top lip 20 fits over stepped shoulder 21A whereby nubs 35 snap into slots 36 thereby locking lid 2 to base 3.

Lid 2 and base 3 each include a pair of aligned supports or feet 42 formed integrally with one end wall 8 and 15, respectively. Supports 42 have a flat outer surface 43 which allows container 1 to stand upright on a flat surface in an endwise manner.

In further accordance with one of the features of the first embodiment of the invention as best shown in FIG. 2, base 3 is divided by walls to define a pair of audio cassette-receiving cavities 50A and 50B. Specifically, walls 51 and 52 project outward from base 3 each between two of walls 14–16 to define cavities 50A and 50B. Walls 51 extend perpendicularly from walls 14 and 15, respectively, to the radiused bend 54 whereby walls 53 extend therefrom to wall 16 in a spaced apart and parallel manner defining a gap 55 therebetween.

The audio cassette-receiving cavities 50A and 50B formed by walls 14–16 and 52–54 are of substantially the same size as standard audio cassettes, and are of a substantially rectangular shape except for the curving scallop side wall of 16 and the notches 56 defined in each corner between walls 14 and 16, and 15 and 16 by the termination of the scallop prior to the end of wall 16.

On each of the shorter sides in each cavity 50A and 50B, that is the wall 51 and a portion of the wall 16, as well as the top wall in each cavity which is wall 53 in cavity 50A and wall 15 in cavity 50B, there are nubs 26 for guiding an audio cassette properly into the cavity. Nubs 26 are basically planar walls perpendicularly extending out from the wall and having a rounded top distal corner 61 and a distal edge 62 extending from the corner to panel 13 in a nonparallel manner to the respective base wall 16, 52, 53, or 15, where the distal edge is farther from this base wall as the edge approaches panel 13. On the remaining of the longer sides in each cavity 50A and 50B, that is, walls 14 of cavity 50A and 53 of cavity 50B, there are L-shaped guides 60 of substantially identical construction as nubs 26 except that towards the base of each guide 60 is a transverse lip 63 that is parallel to but raised above panel 13. This lip 63 supports the top of any standard audio cassette placed within the respective cavity since this top portion is generally of a lesser thickness than the base or bottom portion on a standard audio cassette. In addition, some of the nubs 26 and guides 60 may project out of the opposing face of the wall such as is shown in FIG. 2 on the opposing face of wall 52, and this structure is integral to the wall yet of a cylindrical or other configuration extending outward from the wall so as to add strength to the walls.

As previously described, each cavity 50A and 50B has a top and bottom. Specifically, the top is the wall having the L-shaped guides 60 therein while the bottom is the opposing wall across the cavity 50A or 50B. This configuration is required if the standard audio cassettes are going to be secured in these cavities via its reels. Since standard audio cassettes include two reels that are closer to the top of the audio cassette than the bottom, any stem or other projection from panel 13 must be properly positioned to correlate with this configuration as the stems extend from panel 13.

In accordance with the invention and this required configuration, stems 70 and 71 extend from panel 13 whereby the stems are spaced apart from each other. Stem 70 is the same distance from wall 52 as stem 71 is from wall 16, while both stems 70 and 71 are closer to the top wall than the bottom wall of each respective cavity, that is, closer to wall 14 than wall 53 in cavity 50A, and closer to wall 53 than wall 15 in cavity 50B. This assures storage of both cassettes in the same direction for reading ease.

Stem 70 includes three identical planar tabs 72, each extending radially from a center axis and 120° from the other. Each of these identical tabs 72 is configured identical to the L-shaped guides 60 so as to receive a reel from a standard audio cassette for prohibiting lateral shifting thereof but not securing the cassette from removal from the cavity.

In contrast to the volumetric structure of stem 70, stem 71 is completely planar and is constructed so as to securely hold a reel from an audio cassette. Stem 71 includes a base 75 with a pair of locking tabs 76 extending therefrom. Each tab 76 has a flexible leg 77 with a neck 78 extending between the base and leg. The legs and necks 77 and 78 on each of the stems 71 are planar and configured such that the legs opposingly extend outward away from each other as shown in FIG. 2. This configuration allows a reel on an audio cassette to "snap over" the legs 77 by temporarily pushing the flexible legs toward each other while the reel moves over them, after which the reel snaps down over the neck 78 and surrounds the necks 78 as the legs 77 fit over the outer or upper edge of the reel as is shown in cavity 50A in FIG. 2. An example of an audio cassette 80 seated within a cavity with one reel 81 laterally restricted by stem 70 and a second reel 82 secured by stem 71 is shown in FIGS. 2 and 3.

As a result of the planar design and thin neck of stem 71, any audio cassette thereon is capable of movement to and away from the other stem 70. This slack or movement area is critical during opening of the container 1 since flexing, twisting, bending, or other movement of the container often temporarily changes the distance between stems 70 and 71. By providing such slack, "popping" off of the audio cassette from one or both stems is prevented.

Figures 3, 7:
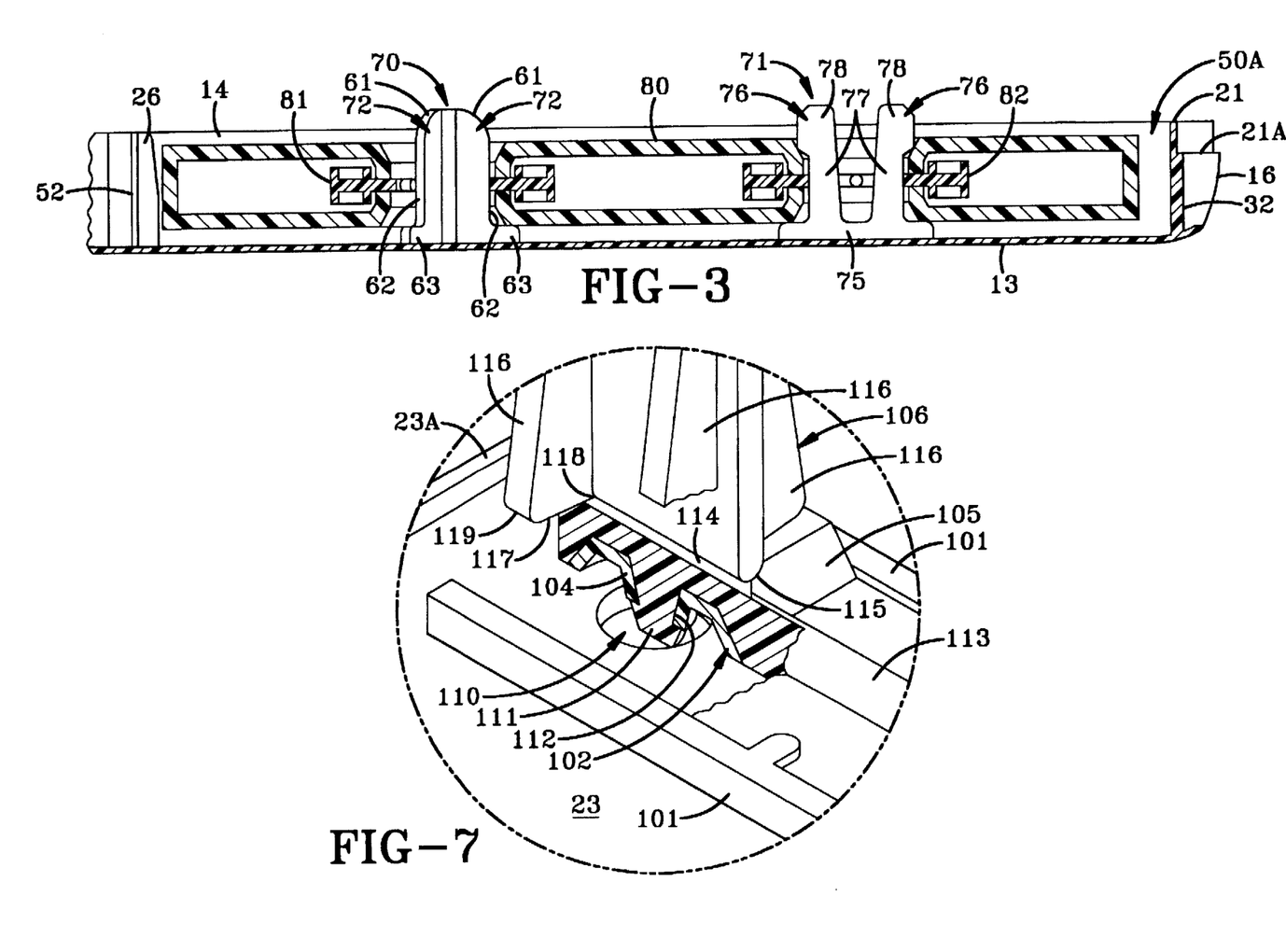
FIG. 3 is a fragmentary sectional view of the audio cassette container of FIG. 2 taken through the two reels of the audio cassette seated therein.
FIG. 7 is an enlarged fragmentary perspective view with a portion in section of the audio cassette container of FIG. 6 taken from circle 7.

The second or four-cassette embodiment is shown in FIG. 4 and is substantially identical to the first embodiment of FIGS. 1–3, as described above, except that instead of only two audio cassette-receiving cavities (both of which were on panel 13), the container 1 includes four audio cassette-receiving cavities, namely, cavities 50A and 50B in panel 13, as well as cavities 50C and 50D in panel 6. These new cavities 50C and 50D are mirror images of 50A and 50B across hinge 4 and thus lid 2 is deeper than in the first embodiment to accommodate the thickness of cassettes therein. In addition, hinge 4 is of a larger dimension between living hinges 24 and 25 so as to accommodate the additional cavities 50C and 50D. Also, walls 7–9 are deeper from panel 6 to lip 20 to fit audio cassettes within cavities 50C and 50D.

The third or six-cassette embodiment is shown in FIGS. 5–8 and is substantially identical to the second embodiment of FIG. 4 as described above except that, in accordance with one of the main features of the invention, an additional center tray 100 is attachable to hinge 4 at approximately the center of the hinge panel 23 as best shown in FIGS. 6 and 8. This center tray 100 in the container 1 provides two additional audio cassette receiving cavities, namely, cavities 121A and 121B of similar construction to cavities 50A–50D. To accommodate this center tray 100, hinge 4 is of a larger dimension between living hinges 24 and 25 in comparison to either of the first or second embodiments so as to accommodate these additional cavities and center tray 100. Furthermore, walls 7–9 of lid 2 and walls 14–16 of base 3 are deeper from panel 6 and 13, respectively, to lip 20 or 21, respectively, to fit this center tray 100 for housing the additional audio cassettes within the cavities 121A and 121B.

In accordance with one of the features of the invention as best shown in FIG. 5, panel 23 includes a pair of elongated ribs 101 spaced apart from and parallel to one another, as well as living hinges 24 and 25. In between these ribs 101 are several female locks 102. Each of these locks is shown in detail in FIG. 7. In the embodiment shown in FIG. 5, each of these female locks 102 includes a center round or conical hole 103 with three equally spaced apart flexible legs 104 extending outward therefrom.

Center tray 100, as shown in FIG. 6, includes several bases 105, each flexibly hinged to a hinge assembly 106, each of which is flexibly hinged to a main tray 107. Each of these bases 105 and hinge assemblies 106 are shown in FIGS. 6 and 8, and in large detail in FIG. 7, while main tray 107 is shown in FIGS. 6 and 8.

Each base 105 is a planar body having a locking region 110 extending from the bottom thereof. Locking region 110 includes a central nub 111 that is of a frusto conical shape with an annular groove 112 therearound. The nub 111 fits within hole 103 in female locks 102 while the annular groove 112 seats over female lock 102 where both the annular groove and female lock 102 have sloped surfaces thereon as shown in the figures. In addition, the bases 104 may be connected by a hinged spine 113 as is shown in FIGS. 6 and 7.

Integrally extending from the top of each of the bases 105 is the hinge assembly 106. As best shown in FIG. 7, the hinge assembly 106 is integrally connected to the base 105 by a thin web 114 which allows hinge assembly 106 to rotate about web 114 along the curved base surface 115 of hinge assembly 106. On each side of each base 106 is a pair of stops 116 which allow this flexible pivoting while restricting such pivoting to 15° in each direction from a perpendicular orientation of each hinge assembly 106 with reference to each base 105. This is specifically accomplished by cutting away each stop 116 along its bottom surface 117 from its innermost connection point 118 with hinge assembly 106 to its outermost point 119, wherein the embodiments shown in FIGS. 6 and 7, this slope is a 15° angle from the surface of the base 105.

Main tray 107 is flexibly hinged by living hinge or web 120 to each of the hinge assemblies 106 as is shown in the figures. Main tray 107 is configured and sized so as to fit within the space in between cavities 50A and 50B, and 50C and 50D within lid 2 and base 3. Specifically, main tray 106 includes two additional cavities 121A and 121 B, each of which are of a similar construction to the cavities 50A-50D. Specifically, each of the cavities 121 A and 121 B includes one of each of stem 70 and stem 71. Each of the cavities is also defined by three outer peripheral walls, these three walls being three of a top wall 122, a center wall 123, a bottom wall 124, and an outermost side wall 125. Specifically, wall 122, 123, and part of 125 defines cavity 121A, while the other side of wall 123, 124, and the remaining portion of 125 defines cavity 121 B. Within each of the cavities 121A and 121B are a plurality of ribs 26 and/or guides 60 of similar or identical construction to those previously described for cavities 50A-50D.

The overall use of this center tray 100 is shown in FIG. 8, where one audio cassette 100 is inserted within cavity 121A. In addition, the overall center tray 100 is shown flexibly moved into its seated yet open position whereby each of the hinge assemblies 105 is pivoted the maximum 15° about flexible hinge or web 114 as restricted by stops 116, and main tray 106 is pivoted about flexible hinge or web 120 such that the back or main face 99 of the main tray 106 is parallel to channel 13 of base 3. The overall container 1 may then be closed whereby center tray 100 slides in a parallel manner over the top of cavities 50A and 50B as hinge assembly 4 pivots 90° about living hinge 25, and lid 2 pivots 90° with reference to hinge 4 about living hinge 24, thereby closing the container in a manner similar to that shown in FIG. 1 for the first embodiment.

It is further understood that main tray 100 could be expanded so as to be of a wider thickness such that it may include a second set of cavities extending out from the opposing surface of panel 99 so as to add two more storage positions within the container 1, thereby providing an eight-cassette embodiment. Similarly, additional main trays 100 may be affixed to hinge assembly 4 in a similar manner such that multiple trays are present in the container thereby further expanding the capacity of this container 1. Obviously, all of these modifications are well within the scope of the above disclosure as each would merely require duplicating either surfaces and/or entire parts in conjunction with expanding the depth of the lid 2 and base 3.

In operation, one or more audio cassettes are placed within base 3 (and/or lid 2 if the second embodiment, and/or lid 2 and center tray 100 if the third embodiment) when container 1 is open as is shown in FIGS. 2 and 4–7, whereby the cassettes snap over stems 70 and 71 such that stem 71 secures them therein. Lid 2 is closed to the position shown in FIG. 1 whereby when closure occurs, top lip 20 slides over stepped shoulder 21 and nubs 35 snap into slots 36. When opening is later desired, cavity 33 provides finger or thumb access for easy opening.

In storage, feet 62 provide sufficient stability so as to stand container 1 upright in an endwise manner as is often desirable. It is also desirous to provide an overall smooth container that is very attractive and less subject to breakage. This is accomplished by molding container 1 with each of its three outer peripheral edges and two outer peripheral corners on each of lid 2 and base 3 as a smooth downwardly curved radius surface, as shown best in FIG. 1 as edges 11 and 18, and corners 12 and 19 on lid 2 and base 3, respectively. Curved edges in combination with the outer curved exposed surface of concave hinge panel 23, provide a very attractive storage container free of pointed corners which are subject to breakage during shipment and use.

In storage also, hinge 23 has an arcuate surface with end walls 23A that provide a somewhat triangular-shaped surface for receiving the end edges of end walls 7–8 and 14–15, when the base and lid are in the closed position, as best shown in FIG. 1. Thus, when moving toward the closed position, these end edges will slide along the outer surfaces of the larger hinge end walls and rest against stepped triangular-shaped shoulders when in the fully closed position, as shown particularly in FIG. 1, to provide a further streamlined and pleasing appearance to container 1.

This hinge configuration ensures good closure of the base and lid, regardless of how the case is closed. Thus, both of the lid and base members can be moved toward each other simultaneously, or either of the members can be moved prior to the other member, as well as the directional movement of hinge panel, without affecting the smooth closure of the base and lid. Also, when in the closed position, outer edges of base 3 will automatically move over the recessed wall portions of the stepped shoulder of lid 2, as discussed above.

In summary, container 1 is molded in a substantially straight configuration as a one-piece member of a lightweight inexpensive plastic material. Living hinges 24 and 25 allow lid 2 and base 3, respectively, to pivot toward one another when container 1 is placed in the closed position. The rounded edges and corners of lid 2 and base 3 prevent chipping and cracking which often occur with square cornered containers. Cavity 33 provides an area for the user to insert his or her thumbs and easily open the container. The cavities 50A–50D, and 121A and 121B when optionally chosen allow any number from 1 to 6 cassettes to be stored in a desirable manner, configuration and size with the cassettes easily accessible therein based upon the living hinges 114 and 120. The center tray 100 is flexibly hinged in a manner allowing the tray to pivot from a parallel to and seated within lid 2 position to a parallel to and seated within base 3 position, as well as any position therebetween including perpendicularly extending vertically from hinge 4. The stems 70 and 71 are specially designed to allow slack such that "popping" off is avoided because one stem is volumetric and used for securing the audio cassette while the other stem is planar with an outer locking lip and skinny inner neck for merely guiding the audio cassette.

Accordingly, the improved audio cassette storage container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved audio cassette storage container is constructed and used, the characteristics of the construction, and the advantageous, new and useful results obtained; the new and useful structures, devices, elements, arrangements, parts and combinations, are set forth in the appended claims.

I claim:

1. A storage container for storing audio cassettes, said storage container including:

a base having a bottom wall, a pair of spaced end walls and a front wall, wherein said base is subdivided by interior walls between the end walls and front wall into at least two audio cassette-receiving cavities, wherein each audio cassette-recieving cavity includes a pair of stems for recieving an audio cassette;

a lid having a bottom wall, a pair of spaced end walls and a front wall, said lid hingedly mounted on the base and movable between open and closed positions on said base, said base and lid forming an audio cassette storage chamber therebetween including the audio cassette-receiving cavities;

one of said stems including at least two flexible legs having necks extending therefrom, said legs being movable inwardly from an unflexed position to a flexed position to enable the necks to pass through a reel of an audio cassette whereby said necks retain the audio cassette on said one stem after the legs resume their unflexed position; and said other stem being configured to pass freely through another reel of the audio cassette without movement, wherein said other stem prevents lateral movement only of the cassette while permitting free removal of the cassette from the said other stem.

2. The storage container defined in claim 1 wherein said lid is subdivided by interior walls between the end walls and front wall into at least two audio cassette-receiving cavities, wherein each audio cassette-receiving cavity includes a pair of stems for receiving an audio cassette.

3. The storage container defined in claim 2 further comprising a hinge assembly hingedly mounting said lid to said base and movable between open and closed positions on said base.

4. The storage container defined in claim 3 further comprising a center tray pivotably affixed to the hinge assembly and providing at least two audio cassette receiving cavities therein, wherein each audio cassette-receiving cavity includes a pair of stems for receiving an audio cassette.

5. The storage container defined in claim 4 wherein the hinge assembly includes at least one lock for pivotably receiving the center tray.

6. The storage container defined in claim 5 wherein each lock includes a center hole with a plurality of slits extending radially therefrom.

7. The storage container defined in claim 5 wherein the center tray includes a main tray and at least one tray hinge assembly insertable within one of the locks in a manner allowing pivoting of the center tray about the hinge assembly, each tray hinge assembly including a base having a nub extending therefrom for insertion into the lock, and a hinge body separated by a flexible web.

8. The storage container defined in claim 7 wherein each tray hinge assembly further includes a living hinge between the tray hinge assembly and the main tray.

9. The storage container defined in claim 7 wherein the flexible web allows pivoting of the hinge body up to 15° from perpendicular with the base.

10. The storage container defined in claim 9 wherein the each tray hinge assembly further includes a living hinge between the tray hinge assembly and the main tray which allows the main body to pivot in relation to the tray hinge assembly.

11. The storage container defined in claim 1 wherein said base end walls are formed integrally with said base front wall to form an outer rounded edge therebetween, and said base end walls and base front wall are formed integrally with said base bottom wall and form an outer rounded edge therebetween, and similarly said lid end walls are formed integrally with said lid front wall to form an outer rounded edge therebetween, and said lid end walls and lid front wall are formed integrally with said lid bottom wall and form an outer rounded edge therebetween.

12. The storage container defined in claim 11 wherein said base and lid each include a flat outer surface formed integrally within at least one end wall for providing a support surface for upright standing in an endwise manner of the storage container.

13. The storage container defined in claim 1 further comprising guide means for guiding audio cassettes inserted within the storage chamber into one of the cavities, wherein the guide means includes a plurality of ribs extending into the audio cassette-receiving cavities from at least one of said walls and interior walls of at least one of said lid and base.

14. The storage container defined in claim 1 wherein the base and hingedly connected lid are formed as an integral one-piece member of a plastic material.

15. The storage container defined in claim 1 further comprising alignment means for aligning said base and lid during closing, wherein the alignment means includes nubs projecting from one of said base and lid and insertable within notches extending into the other of said base and lid.

16. The storage container defined in claim 1 further comprising a locking mechanism for locking said base and lid together, wherein the locking mechanism includes nubs projecting from one of said base and lid and insertable within slots extending into the other of said base and lid.

17. The storage container defined in claim 1 wherein said front wall in each of the base and lid includes a concave recess in a central portion thereof, and said base recess and lid recess forming a front cavity therein when said base and lid are in a closed position.

18. A storage container for storing audio cassettes, said storage container including:

a base having a bottom wall, a pair of spaced end walls and a front wall, wherein said base is subdivided by interior walls between the end walls and front wall into at least two audio cassette-receiving cavities, wherein each audio cassette-receiving cavity includes a pair of stems for receiving an audio cassette;

a lid having a bottom wall, a pair of spaced end walls and a front wall, said lid hingedly mounted on the base and movable between open and closed positions on said base, said base and lid forming an audio cassette storage chamber therebetween including the audio cassette-receiving cavities, said lid being subdivided by interior walls between the end walls and front wall into at least two audio cassette-receiving cavities, wherein each audio cassette-receiving cavity includes a pair of stems for receiving an audio cassette;

a hinge assembly hingedly mounting the lid to the base and movable between open and closed positions on the base;

a center tray pivotably affixed to the hinge assembly and providing at least two audio cassette receiving cavities therein, wherein each of said audio cassette-receiving cavities includes a pair of stems for receiving an audio cassette; and said hinge assembly including at least one lock for pivotably receiving the center tray, the center tray including a main tray and at least one tray hinge assembly insertable within one of the locks in a manner allowing pivoting of the center tray about the hinge assembly, each tray hinge assembly including a base having a hub extending therefrom for insertion into the lock, and a hinge body separated by a flexible web.

19. The storage container defined in claim 18 wherein each tray hinge assembly further includes a living hinge between the tray hinge assembly and the main tray.

20. The storage container defined in claim 18 wherein the flexible web allows pivoting of the hinge body up to 15° from perpendicular with the base.

21. The storage container defined in claim 20 wherein the each tray hinge assembly further includes a living hinge between the tray hinge assembly and the main tray which allows the main body to pivot in relation to the tray hinge assembly.

22. The storage container defined in claim 1 wherein the other of said stems includes three equally spaced tabs extending radially from a center axis.

23. In combination, an audio cassette having two spaced apart reels and a storage container for securely holding said cassette within the container, said container including:

a base having a bottom wall, a pair of spaced end walls and a front wall;

a pair of stems extending from the bottom wall for receiving and retaining the audio cassette;

a lid having a bottom wall, a pair of spaced end walls and a front wall, said lid hingedly mounted on the base and movable between open and closed positions on said base, said base and lid forming an audio cassette storage chamber therebetween;

one of said stems including at least two flexible legs having necks extending therefrom, said legs being movable inwardly from an unflexed position to a flexed position to enable the necks to pass through one of the reels of the audio cassette whereby said necks retain the audio cassette on said one stem after the legs resume their unflexed position; and said other stem being configured to pass freely through the other reel of the audio cassette without movement, wherein said other stem prevents lateral movement only of the cassette while permitting free removal of the cassette therefrom.

24. The combination defined in claim 23 wherein the other of said stems includes three equally spaced tabs extending radially from a center axis.

\* \* \* \* \*